Figure 1:
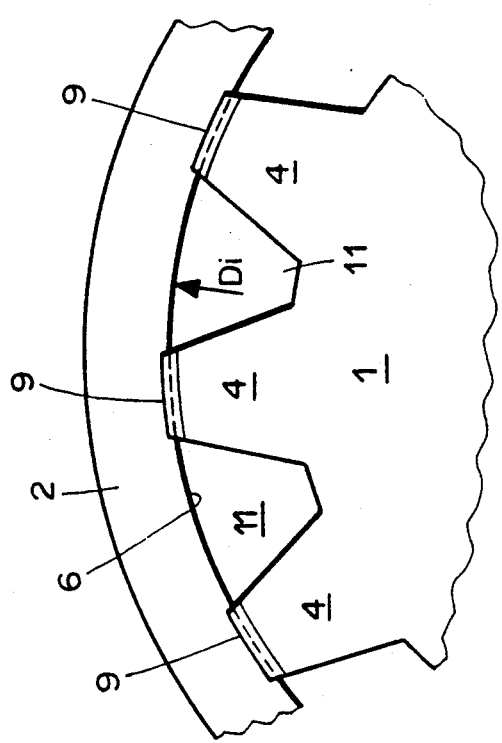

United States Patent [19]
Coste

[11] Patent Number: 5,133,694
[45] Date of Patent: Jul. 28, 1992

[54] PULLEY

[75] Inventor: Laurent Coste, Moutier, Switzerland

[73] Assignee: Tornos-Bechler SA, Fabrique de Machines Moutier, Moutier, Switzerland

[21] Appl. No.: 701,081

[22] Filed: May 16, 1991

[30] Foreign Application Priority Data

May 17, 1990 [CH] Switzerland .......................... 1674/90

[51] Int. Cl.$^5$ .............................................. F16H 7/00
[52] U.S. Cl. ...................................... 474/152; 29/892
[58] Field of Search ...................... 474/152, 151, 166; 29/892, 892.1, 892.11

[56] References Cited

U.S. PATENT DOCUMENTS 3,156,130 11/1964 Gant ..................................... 474/151
3,650,158 3/1972 Van Huis ......................... 474/152 X
5,066,264 11/1991 Romano ............................. 474/152

FOREIGN PATENT DOCUMENTS 2314000 9/1974 Fed. Rep. of Germany .
2804549 8/1979 Fed. Rep. of Germany .
2833458 2/1980 Fed. Rep. of Germany .

Primary Examiner—Thuy M. Bui
Attorney, Agent, or Firm—Oliff & Berridge

[57] ABSTRACT

Cheeks (2, 3) in the form of a solid rim are made integral with a pulley body (1) in that their cylindrical inside surfaces (6) are fitted under tension against cylindrical surfaces forming the bottoms of grooves (7, 8). Their positioning is carried out either by hot-collaring or by driving onto conical surfaces (9, 10). The bottoms of channels contrived between teeth (4) communicate with the outer sides of the pulley, thus permitting the movement of air during operation with a notched belt (5) and, consequently, a reduction of operating noise.

11 Claims, 1 Drawing Sheet

PULLEY

This invention relates to pulleys, particularly for notched belts, of the type having a pulley body and two cheeks for guiding the belt.

Pulleys of this kind are used for driving rotary parts, not only in the field of machine tools but also in other fields, such as motor assemblies or control devices, etc.

The present invention aims at improving the manufacture of these pulleys owing to various measures which can be combined and which contribute advances from several points of view.

Currently, a large number of pulleys of the type intended to co-operate with notched belts—hence having teeth along their periphery—or of the type intended to co-operate with smooth belts—hence having a smooth cylindrical surface at their periphery—are provided with cheeks intended to guide the belt; and these cheeks are made up of thin, flat rims fitted on cylindrical bearing surfaces of the pulley body and fixed by crimping at three or four points on the circumference of the pulley against a shoulder of the body. In certain cases, the rim is beveled on its inside face at its periphery.

This design has proved to have several drawbacks:

(a) The mounting and machining of the cheeks, as well as the machining of the pulley, require complex operations. In particular, the crimping of the cheek after it has been placed on its bearing surface requires special tools.

(b) In the case of toothed pulleys intended to co-operate with notched belts, it is found that the teeth of the belt are frequently subject to excessive wear and tear owing to faulty alignment.

(c) Likewise in the case of toothed pulleys intended for notched belts, the conventional arrangement has the drawback of producing a noise which heightens as the speed increases, this noise being due to exhausting of the air between the belt and the cheeks when the teeth engage the belt.

German Disclosed Applications (DOS) Nos. 28 04549 and 28 33458 describe particular designs applied to toothed pulleys for notched belts. In the first of these documents, the cheeks have apertures, whereas in the second one, the radial section of the cheeks is such that their peripheries are pressed obliquely against the ends of the teeth. In the first case, only the drawback mentioned under (c) above is avoided, while in the second case, drawback (a) is eliminated but not (b) and (c).

It is an object of this invention to provide an improved pulley designed in such a way that machining and mounting of the pulley can be simplified, its precision augmented and, consequently, the reliability of the devices enhanced.

A further object of this invention is to provide a toothed pulley having air passages contrived at the ends of the channels situated between the teeth, thus eliminating the noise previously noticed.

To this end, in the pulley according to the present invention, of the type initially mentioned, the cheeks are annular parts having an inside surface made integral with the pulley body by radial tightening.

Figure 2:
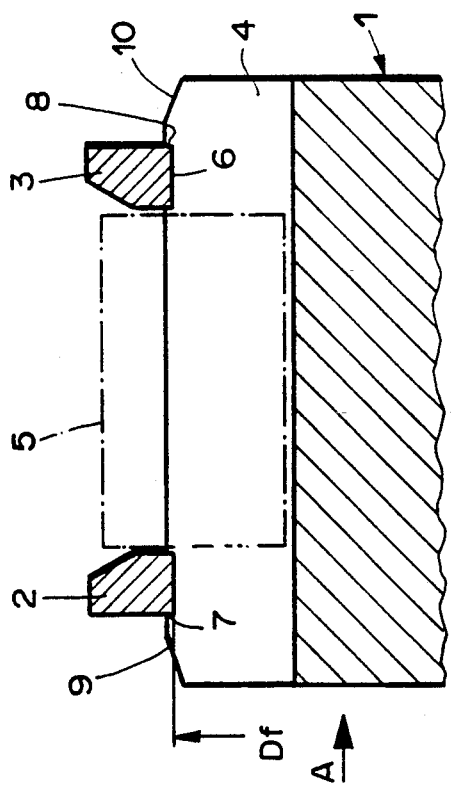
Figure 3:
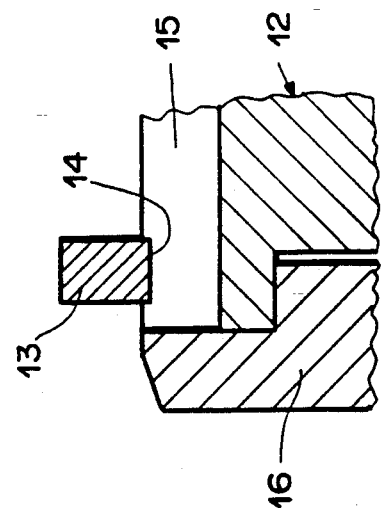

Preferred embodiments of the invention will now be described in detail with reference to the accompanying drawings, in which:

FIG. 1 is a partial sectional view of a pulley according to the present invention for a notched belt, taken on a plane containing the axis, FIG. 2 is an elevation viewed in the direction indicated by arrow A in FIG. 1, and FIG. 3 is a view analogous to FIG. 1, showing another embodiment of the inventive pulley.

The pulley shown partially in FIGS. 1 and 2 is composed of three parts: a pulley body 1 and two cheeks 2 and 3. At its periphery, pulley body 1 has teeth 4 intended to co-operate with the teeth of a notched belt 5 shown in dotdash line in FIG. 1. Cheeks 2 and 3 are solid, inset, rim-shaped parts. These parts are machined with a cylindrical inside surface 6, the diameter of which is precisely determined as a function of the dimensions of grooves 7 and 8 contrived in the apical surfaces of teeth 4. These grooves are situated near the ends of teeth 4, as may be seen in FIG. 1, and have a rectangular cross-section. Their depth is such that the diameter Df of the bottom of grooves is slightly greater than the machining diameter Di of inside surfaces 6.

At the outer sides of grooves 7 and 8, the apical surfaces of teeth 4 continue for a short distance, after which teeth 4 have slightly inclined conical surfaces 9 and 10.

Cheeks 2 and 3 may be driven over conical surfaces 9 and 10 in such a way that elastic dilation enables them to engage in grooves 7 and 8.

Once cheeks 2 and 3 have been put in place, their inside surfaces 6 are tightened onto the bottoms of grooves 7 and 8 which are machined to diameter Df, so that these surfaces are made integral with pulley body 1 at these locations. An extremely stable and precise fitting of cheeks 2 and 3 and, consequently, of their inside faces relative to pulley body 1 is thus obtained, which improves guidance of belt 5. The sections of cheeks 2 and 3 situated between teeth 4 are acted upon resiliently by a bending stress, thus ensuring a rigid attachment.

As has been seen earlier, an additional advantage of this design is that channels 11 bounded on pulley body 1 between teeth 4 communicate under cheeks 2 and 3 with the side faces of the pulley at each end. It has been found that owing to this arrangement, operating noise of the notched belt is actually considerably reduced, above all at high speeds.

FIG. 3 illustrates another embodiment, in connection with which three different measures may be adopted:

I. Instead of having internally beveled cheeks such as cheeks 2 and 3, a pulley body 12 is here equipped with cheeks such as cheek 13, the cross-section of which is rectangular and solid. Cheek 13 as shown in FIG. 3 is fitted in the same way as cheek 2 or cheek 3 in a groove 14 made in the apical faces of teeth 15 of pulley body 12.

II. In this embodiment, the width of pulley body 12 is reduced by leaving only a short length of the apical surface face of teeth 15 at the outer side of groove 14.

III. An auxiliary tool 16 is provided so that the cheeks may be driven on. It is this tool 16 which includes the frustoconical surfaces 17 by means of which the cheeks may be positioned. After removal of tool 16, which may be in the form of a solid disk or a toothed disk, the passages which cause the channels between teeth 15 to communicate with the outer sides of the pulley are created as in the first embodiment.

With the arrangement of FIG. 3, cheeks 2, 3, or 13 may also be positioned in grooves 7, 8, or 14 by preheating so that the diameter Di of surfaces 6 is enlarged beyond the diameter of the apical surfaces of teeth 4 or 15 (hotcollaring).

The use of solid, inset cheeks, the cylindrical inside surfaces of which are made integral with matching surfaces of the pulley body by means of radial tightening, may equally well be provided in the case of smooth pulleys. The advantage in this case is simplification of the machining and mounting and better guidance of the belt.

Moreover, it is also possible to do without grooves 7 and 8 and to use portions of the apical surfaces of the teeth themselves, or the outside surface of the pulley body in the case of a smooth pulley, to produce the seating of the cheeks by radial tightening as described above.

What is claimed is:

1. A pulley, particularly for a notched belt, of the type having a pulley body having an outside surface and two cheeks for guiding the belt, wherein the improvement comprises cheeks in the form of annular parts having respective inside surfaces made integral with said pulley body by radial tightening.

2. The pulley of claim 1, wherein said cheeks are fixed to said pulley body by hot-collaring or by force-fitting on portions of said outside surface of said pulley body.

3. The pulley of claim 2, wherein said inside surfaces of said cheeks and said surface portions of said pulley body are cylindrical and coaxial with said pulley.

4. The pulley of claim 3, wherein the diameter of said inside surfaces of said cheeks when cold or in unexpanded state is slightly less than the diameter of said cylindrical surface portions of said pulley body.

5. The pulley of claim 4, wherein said cylindrical surface portions of said pulley body form the bottoms of grooves, the inside edges of said cheeks being fixed in said grooves.

6. The pulley of claim 5, wherein said pulley body comprises cheek-engagement cones adjacent to said grooves, the diameter of the large base of said cones being slightly greater than the diameter of said cylindrical surface portions.

7. The pulley of claim 1, wherein said cheeks each include a bevel on facing sides thereof.

8. The pulley of claim 1 intended for a notched belt, wherein said pulley body comprises a plurality of teeth and a plurality of parallel channels separating said teeth and oriented in the direction of the axis of said pulley, said channels communicating at at least one end thereof with a side of said pulley body by passages permitting movements of air during rotation.

9. The pulley of claim 8, wherein said inside surfaces of said annular cheeks are fixed by radial tightening on parts of the apical faces of said teeth.

10. The pulley of claim 9, wherein said apical faces of said teeth are cylindrical at least in the zones intended to receive said inside surfaces of said cheeks.

11. The pulley of claim 10, wherein a mounting tool is associated with said pulley, said mounting tool having frustoconical cheek-engagement surfaces and being fixable on each side of said pulley for the engagement of one of said cheeks.

* * * * *